United States Patent
Coupin et al.

(10) Patent No.: US 6,992,136 B2
(45) Date of Patent: Jan. 31, 2006

(54) TRANSPARENT BLOCK COPOLYMERS AND PRODUCTION THEREOF

(75) Inventors: Thierry Coupin, Carnieres (BE); Jean Philippe Hallet, Brussels (BE)

(73) Assignee: Atofina Research, Seneffe-Feluy (BE)

( * ) Notice: Subject to any disclaimer, the term of this patent is extended or adjusted under 35 U.S.C. 154(b) by 107 days.

(21) Appl. No.: 10/681,379

(22) Filed: Oct. 9, 2003

(65) Prior Publication Data

US 2004/0147682 A1  Jul. 29, 2004

(30) Foreign Application Priority Data

Oct. 11, 2002 (EP) .................................. 02292511

(51) Int. Cl.
*C08F 297/04*  (2006.01)
*C08L 9/06*  (2006.01)

(52) U.S. Cl. .......................... 525/89; 525/98; 525/271; 525/316

(58) Field of Classification Search .................. 525/89, 525/98, 271, 316
See application file for complete search history.

(56) References Cited

U.S. PATENT DOCUMENTS

| | | |
|---|---|---|
| 3,264,375 A | 8/1966 | Jones |
| 4,167,545 A | 9/1979 | Fahrbach et al. |
| 4,877,863 A | 10/1989 | Lanza et al. |
| 4,925,899 A | 5/1990 | Rendina et al. |
| 4,939,208 A | 7/1990 | Lanza et al. |
| 5,130,377 A | 7/1992 | Trepka et al. |
| 5,212,249 A | 5/1993 | Richie et al. |
| 5,234,998 A | 8/1993 | Nicol et al. |
| 5,319,033 A | 6/1994 | Trepka et al. |
| 5,369,175 A | 11/1994 | Hoximeier et al. |
| 5,436,298 A | 7/1995 | Moczygemba et al. |
| 5,439,975 A | 8/1995 | Jacquemin et al. |
| 5,447,995 A | 9/1995 | Hoxmeier et al. |
| 5,496,876 A | 3/1996 | Jacquemin et al. |
| 5,539,058 A | 7/1996 | Nicol |
| 5,545,690 A | 8/1996 | Trepka et al. |
| 5,635,561 A | 6/1997 | Nicol |
| 5,691,420 A | 11/1997 | Leffelaar et al. |
| 5,705,569 A | 1/1998 | Moczygemba et al. |
| 6,127,487 A | 10/2000 | Ahmed et al. |
| 6,150,463 A | 11/2000 | Lanza et al. |
| 6,265,484 B1 * | 7/2001 | Trepka et al. .................. 525/98 |
| 6,265,485 B1 | 7/2001 | Trepka et al. |

FOREIGN PATENT DOCUMENTS

| | | |
|---|---|---|
| EP | 0 270 515 | 6/1988 |
| EP | 0314256 A | 5/1989 |
| EP | 0436225 A | 7/1991 |
| EP | 0540109 A | 5/1993 |
| EP | 0718330 A | 6/1996 |
| EP | 1233028 A | 8/2002 |
| EP | 0255001 A | 2/2003 |
| GB | 2270915 A | 3/1994 |

OTHER PUBLICATIONS

European Search Report EP 02 29 2511 (pp 1-3) and Annex (pp 1-4).

* cited by examiner

*Primary Examiner*—James J. Seidleck
*Assistant Examiner*—Olga Asinovsky
(74) *Attorney, Agent, or Firm*—Smith, Gambrell and Russell, LLP

(57) ABSTRACT

The invention relates to a novel transparent block copolymer and its process for the manufacture. The process comprises a first partial killing of at least the living copolymeric species $R-S_1-B_1-M$ with a multi-functional deactivation agent where $S_1$ is a monovinyl-substituted aromatic homopolymer, $B_1$, is a conjugated diene homopolymer, M is an alkali metal and R is an alkyl (RM being an initiator) and further comprises a second total deactivation of at least the living tapered block copolymeric species $R-S_1-B_1-B_2/S_2-M$ (obtained by adding a feed $B_2/S_2$ to the reaction medium) by a mono-functional deactivation agent (the terminating agent).

17 Claims, No Drawings

TRANSPARENT BLOCK COPOLYMERS AND PRODUCTION THEREOF

TECHNICAL FIELD OF THE INVENTION

The present invention relates to transparent block copolyrmers and in particular to transparent block copolymers produced from monovinyl-substituted aromatic monomers and conjugated dienes. The present invention also relates to a process for producing transparent block copolymers and in particular for producing transparent block copolymers of monovinyl-substituted aromatic monomers and conjugated dienes.

PRIOR ART

EP-A-0270515 and its corresponding U.S. Pat. No. 4,939,208 disclose the production of transparent linear block copolymers represented by the formula S1-B1-B/S-S2 having two monovinyl-substituted aromatic blocks S1 and S2 of different molecular weight. In particular, it is disclosed that transparent linear resinous conjugated diene/monovinyl-substituted aromatic block copolymers have improved impact properties.

Nevertheless, as well known in the art, linear structures are sometimes difficult to process especially in high shear molding systems like injection or blown films extrusion. Resinous block copolymers having at least three branches and having multimodal structure are described in Moczygemba et al., U.S. Pat. No. 5,705,569. The process disclosed by Moczygemba et al.—and based on a double initiation—is not easy to achieve a well controlled molecular weight. Ahmed et al. in U.S. Pat. No. 6,127,487 tried to improve the properties balance of transparent block copolymers. The process developed to produce Ahmed's product is probably of low industrial use as it request at least twelve steps before recovering the copolymer from its solvent. U.S. Pat. No. 6,265,485 to Trepka et al. discloses a resinous tapered block copolymer with low blueness and good impact strength. As common for high impact properties, the clarity of Trepka's copolymer is dramatically affected by the tapered sequences used in the process.

There is thus a need in the art for yet further improved combinations of optical and mechanical properties, in particular high levels of both clarity and impact resistance, in combination with high processability of the resins, in particular high flowability, which would enable the material to be used in a wider range of applications than hitherto and to be manufactured using a wider range of molding techniques than hitherto, in particular compression, sheets or films extrusion and injection molding. Briefly speaking, there is a need for an improved polymer having high spiral flow (evidencing good processability), high flexural modulus (evidencing rigidity), high elongation at break (evidencing elasticity), high impact resistance (evidencing ductility) and low haze (evidencing transparency).

The present invention aims to meet the needs as formulated in the preceding paragraph.

It is also known in the art to produce transparent block copolymers having high impact resistance by forming blends of high strength synthetic rubbers (e.g. polybutadiene) with polystyrene, optionally with one or more block copolymers e.g. styrene-butadiene-styrene block copolymers, having for example 40 wt % styrene content and optionally with a high impact polystyrene, for example in an amount of from 0.25 to 2 wt %. However, these blends show properties below the required levels; for example these blends have low transparency due to their low styrene content.

The present invention also aims to overcome these problems of the prior art.

SUMMARY OF THE INVENTION

The present invention provides a novel transparent resinous block copolymer of monovinyl-substituted aromatic hydrocarbon and conjugated diene which exhibits a high processability and conjugated dienes which exhibits a high processability during transformation in articles with high impact resistance, high flexural modulus and high transparency.

It is another object of this invention to provide a novel transparent resinous block copolymer of monovinyl-substituted aromatic hydrocarbon and conjugated dienes suitable for use in blends with polymers of styrene, said blends exhibiting high impact resistance, high flexural module, high transparency and high processability during transformation in articles.

Hence, the invention provides a process for the production of a transparent resinous copolymer as defined in claims 1 to 7. The invention also provides the polymer obtainable by the process of the invention.

The invention also provides a copolymer as defined in claims 1 to 9 to 15.

The invention also provides a resinous blend comprising at least one transparent resinous copolymer of the invention.

The invention finally provides a process for manufacturing molded objects comprising the step of injecting the transparent resinous copolymer or the blend of the invention.

DETAILED DESCRIPTION OF THE INVENTION

Copolymers

The present invention is predicated on the discovery by the present inventors that, for the production of transparent resinous conjugated diene/monovinyl-substitued aromatic block copolymers, it is of high interest to use the process which comprises a first partial killing of at least the living copolymeric species $R-S_1-B_1-M$ with a multi-functional deactivation agent where $S_1$ is a monovinyl-substitued aromatic homopolymer, $B_1$ is a conjugated diene homopolymer, M is an alkali metal and R an alkyl (RM being an initiator) and where said production comprises a second total deactivation of at least the living tapered block copolymeric species $R-S_1-B_1—B_2/S_2-M$ (obtained by adding a feed $B_2/S_2$ to the reaction medium) by a mono-functional deactivation agent (the terminating agent), the presence of at least two in situ produced polymeric species yielding a good combination of optical and mechanical properties with improved flow properties.

The vinyl-aromatic content, the molecular weights of the two major species as well as their relative proportions are controlled so that the final mechanical properties and the improved processability can be achieved. The relative proportion of the two major species is proportional to the molar ratio of the multifunctional deactivator agent to the active initiator corrected for the stoichiometry. As indicated above, the process of the invention is thus based in most part on the control of this ratio, which is selected so that, given the relative contents of the monomers, the final properties of the resinous copolymer can be achieved.

Thus, if the first polymer species $(S_1-B_1)X$ is, for example, a styrene-butadiene block copolymer having a high styrene content, for example greater than 50 wt %, and the second block polymer species having high styrene content, for example greater than 80 wt %, this can provide high transparency for the block copolymer in conjunction with high impact resistance. The provision of in situ generated first and second polymeric species provides a high processability polymer grade, which can readily flow in an extrusion line, injection machine, blown-film line or blow-molding machine. It should be noted that it is conceivable to carry out this process in multiple reactors followed by mixing the resulting polymer solutions.

The present invention is also predicated on the finding by the present inventors that by employing sequential or step wise polymerization in the production of different blocks or segments of multiple block transparent conjugated diene/monovinyl-substituted aromatic block copolymers in conjunction with control of the respective ratios of different blocks, this produces unexpected and surprising effects on the properties of the resultant block copolymers.

Most particularly it has been found that together with improved impact resistance, the haze of the polymers tends to be decreased because of the better dispersion of the rubber phase in the high styrene matrix, thereby enhancing the transparency of the polymers. Accordingly, the presence of a compromise in such known block copolymers, where the properties of impact resistance and haze were often in competition, can be removed in accordance with the present invention. This accordingly permits transparent block copolymers produced in accordance with the present invention to be able to be employed in new applications where the properties of high levels of clarity and impact resistance are required, such properties currently being met by other polymers such as polypropylene and polyethylene terephthalate.

Furthermore, the block copolymers produced in accordance with the invention have high flowability, as for example measured by the spiral flow index of the polymers, enabling the polymers readily to be processed by compression, extrusion or injection molding.

It is preferred that the weight ratio (or proportion) between the conjugated diene and the monovinyl-substituted aromatic monomers present in the block polymeric species of the present invention be between about 15:85 and 30:70, more preferably from about 15:85 to 35:75. When more than 85 parts of the monovinyl-substituted aromatic monomer are employed, a decrease in impact strength and in elongation are observed, whereas when less than 70 parts of the monovinyl-substituted aromatic monomer are used, the polymer has an elastomeric texture and a deterioration of the required properties is observed. Most preferably, the block copolymer has a ratio styrene to diene from 75:25 to 82:18, most typically about 80:20.

The total styrene content of the block copolymer of the present invention has a significant effect on the impact resistance of the block copolymer. While a continuous increase of the styrene content tends to correspond with an almost continuous improvement in the optical properties of the polymer, this does not apply to the impact resistance, where, at a given styrene content, the impact resistance falls sharply.

The present invention is further predicated on the finding by the present inventors that the impact resistance of the transparent block copolymer is affected by the monovinyl-substitued aromatic monomer (e.g. styrene) content, and the way the monovinyl-substitued aromatic monomer is distributed among and in the first and second polymeric species. Distribution of the monovinyl-substituted aromatic monomer (e.g. styrene) among the conjugated diene chains lead to the formation of a tapered block and referred to as $-B_2/S_2$- segment. In a tapered block the monomers sequence distribution can be described as a first block part which is diene-rich, followed by a middle block part that is initially richer in diene with a gradual change in composition until it becomes richer in monovinyl-substitued aromatic monomer and a final block of monovinyl-substitued aromatic monomer. A more complete description is given by H. L. Hsieh and R. P. Quirk in "Anionic polymerisation", Marcel Dekker Inc. (1996). Attention should be given with regard to the randomness of the monovinyl-substitued aromatic monomer distribution in the conjugated diene/monovinyl-substitued aromatic copolymer. The randomness or randomization of the monovinyl-substituted aromatic monomer will preferably reach a minimum threshold value of 10%. The "randomness" or "randomization" of the monovinyl-substitued aromatic monomer or the random styrene is defined as the difference between the total bound monovinyl-substitued aromatic hydrocarbon content minus the total block monovinyl-substituted aromatic hydrocarbon content, both expressed as weight % of the total resin. Block and total monovinyl-substitued aromatic hydrocarbon content is measured by using NMR techniques. For example, the randomness if from 15 to 20%.

In accordance with a specific aspect of this invention, the composition produced in accordance with the invention comprises the following polymeric species:

$$R-(S_1-B_1)X \qquad (i)$$

$$R-S_1-B_1-B_2/S_2-M \qquad (ii)$$

where species (i) and (ii), the major species, are present in high concentration in the reaction medium and where species (i) and referred to as short chains have lower molecular weights than species (ii) which are referred to as long chains or linear structure.

The living species (ii) is treated with a terminating agent in order to recover a killed polymer. (Due to the presence of impurities and/or scavengers referred to as K terminator in the solvent, the monomer charges and deactivation agents, a very small amount of living polymeric species $R-S_1-M$ and/or living polymeric species $R-S_1-B_1-M$ can be killed to form respectively the polymeric species (iii) $R-S_1-K-M$ and the polymeric species (iv) $R-S_1-B_1-K-M$. These species can be neglected for the purpose of the instant invention).

The coupled-like copolymer, i.e. the first copolymer species (i), can be of various types; it can also be of a random nature. Using the common naming, it can be $(S_1-B_1)_n$, $(S_1-S_2-B_1)_n$, $(S_1-S_2/B_1)_n$ etc.

The linear random copolymer species (ii) can also be of various types. It can be, for example, $S_1-B_3-S_2/B_2$; $S_1-B_1-S_2/B_2-S_3$; etc. Examples of such structures are given in the previously cited patents, EP-A-0270515, U.S. Pat. No. 5,705,569, U.S. Pat. No. 6,127,487 and U.S. Pat. No. 6,265,485

In accordance with a specific aspect of the invention, $S_1$ and $S_2$ are monovinyl-substituted aromatic homopolymer blocks having 4 molecular weights within the range of about 5000 Daltons to 20,000 Daltons for $S_1$ and about 50,000 Daltons to 150,000 Daltons for $S_2$. $B_1$ is a conjugated diene homopolymer block having a molecular weight within the range of about 3000 Daltons to 10,000 Daltons. $B_2/S_2$ is a conjugated diene/monovinyl-substituted aromatic random copolymer block (tapered block) having a molecular weight within the range of about 10,000 Daltons to 100,000 Daltons. The molecular weight of $S_2$ is significantly greater thaxithat of $S_1$, for example from a factor of 5 up to 10.

The copolymeric species (ii) obtained according to the process of the invention has a molecular weight generally ranging from about 100,000 Daltons to about 300,000 Daltons, preferably from about 140,000 Daltons to 200,000 Daltons, especially from about 150,000 Daltons to 180,000 Daltons.

Preferably, the transparent block copolymeric species (ii) contains from about 15 to 40% by weight of conjugated diene units and from about 60 to 85% by weight of monovinyl-substituted aromatic units.

The final transparent block copolymer recovered after the solvent evaporation may have a viscosity in toluene of from 2 to 10 cst (determined at 25° C. using a 5.23 weight % solution of the polymer in toluene) and has a melt flow index (MI 5/200° C.) of from 1 to 40 g/10 min and preferably from 5 to 25 g/10 min, the melt index MI being measured in accordance with the procedures of ASTM using a temperature of 200° C. and a weight of 5 kg. The final transparent block copolymer recovered after the solvent evaporation contains from 5 weight % to 40 weight % Of the copolymeric species (i)

Examples of the conjugated dienes which can be employed in the present invention include 1,3-butadiene, isoprene, piperylene, 2,3-dimethyl-1,3-butadiene, 3-butyl-1, 3-octylidene, 2-phenyl-1,3-butadiene and mixtures thereof.

The monovinyl-substituted aromatic monomers which can be employed in the block copolymer of the present invention include, for example, styrene, alpha-methyistyrene, vinyltoluene, 4-n-propylstyrene, 4-cyclohexylstyrene, 4-decyistyrene, 2-ethyl-4-benzyl-styrene, 4-p-tolnylstyrene, 4-(4-phenyl-m-butyl)styrene, vinyl-naphthalene and other styrenes which are substituted on the ring. Styrene, isoprene and 1,3-butadiene are the preferred monomers due to their availability and consistent good results.

Conjugated dienes and monovinyl substituted aromatic monomers are, as usual in the art, preferably free of impurities which may act as scavengers in the reaction medium.

Process

The transparent block copolymers may be prepared by anionic block polymerization in a solvent medium in the presence of an initiator. The following disclosure is given by reference to one preferred embodiment of the process of the invention, but it will be clear to the skilled man that this can be varied and be adapted to any process.

The polymerization is carried out in a solvent preferably in absence of oxygen and water under an inert gas like nitrogen. Polymerization is carried out in presence of an initiator. Examples of suitable initiators that can be useful in the present invention can be found in U.S. Pat. No. 4,939,208 to Lanza et al. Usually the initiator is an organo-alkali metal compound of the formula RM wherein R is an alkyl, cycloalkyl or aryl radical containing for example 4 to 8 carbon atoms and M is an alkali metal. The preferred initiators are organolithium compounds, such as ethyllithium, propyllithium, butyllithium, amilelithium, hexyllithium, cyclohexyllithium, phenyllithium, tolyllithium, naphthyllithium, and their isomers, and especially sec-butyllithium, n-butyl lithium and tert-butyllithium.

The amount of said initiator used in the polymerization process of the present invention depends upon the molecular weights desired. If less initiator is used, there will be less active sites so that at the time of addition of the monomers, the monomers will react with fewer active sites resulting in an increased molecular weight.

Examples of suitable solvent that can be useful in the present invention can be found in U.S. Pat. No. 4,939,208 to Lanza et al. The solvent can be an aliphatic, alicyclic or aromatic hydrocarbon (and the initiator is generally an organolithium compound). Examples of suitable solvents that can be employed in the polymerization process of the present invention include aromatic hydrocarbons such as benzene, toluene, xylene, ethyl benzene and naphthalene; and aliphatic and cycloaliphatic hydrocarbons such as isobutane, n-pentane, cyclopentane, hexane, cyclohexane, methyl cyclohexane, and mixtures thereof. Cyclohexane, and more preferably a mixture of cyclohexane and hexane, are preferably used due to their availability and to the solubility of styrene therein when using styrene-rich polymerization systems.

The proportion by weight of solvent to the total monomer charge in the reaction medium will depend upon the viscosity of the medium and upon the amount of heat transfer in the reactor, but is preferably between about 2:1 and 10:1 and most preferably between about 3:1 and 6:1.

Impurities in the solvent like water, alcohol, mercaptan and the like which destroy the initiator and/or the living chains are preferably removed, in accordance with known techniques in the art.

The polymerization according to the present invention is preferably carried out at a temperature from −20° C. to 150° C. and a pressure sufficient to maintain the monomers and solvents in the liquid phase. The polymerization is more preferably carried out at a temperature between about 20° C. and 120° C. and at a pressure between atmospheric and 10 bars. In accordance with one aspect of the invention, there is a control of the various temperatures of the various steps during the homopolymerization and copolymerization stages; such a control can be achieved by any known cooling system as described in the art. (examples being use of a reflux cooler, an external heat exchanger with circulation pump, and the like).

According to one aspect of the invention, the process of this invention comprises four charges or feeds of monomers, respectively $S_1$, $B_1$, $B_2$, $S_2$ added in the reactor in amount respectively referred to as $Qs_1$, $Qb_1$, $Qb_2$, $Qs_2$. The sum of the respective amounts of momoner charges $Qs_1$, $Qb_1$, $Qb_2$, $Qs_2$ in this process is referred to as the total monomer charge Qm.

The process according to this embodiment of this invention comprises mainly four steps.

Step (1) is charging solvent, (preferably with polar compounds, see below) and monovinyl-substituted aromatic monomer referred to as $S_1$, in the reactor to form the first block species R-$S_1$-M in the presence of sufficient organoalkali metal initiator RM to initiate the polymerization and achieve the molecular weight desired for. This molecular weight is controlled by in-line or laboratory Gel Permeation Chromatography (GPC).

The proportion by weight of $S_1$ to the total monomer charge is comprised between 5% and 30% and most preferably from 10% to 25% (inclusive).

At the beginning of this step, the temperature of the monovinyl-substituted aromatic monomer in the presence of the solvent and the organolithium initiator which is known as the initiation temperature ($T_{init}$) is preferably set below 60 C, more preferably below 55 C.

The contact time of step (1) is sufficient to allow polymerization to occur until essentially all the monomer is consumed. The completion of the polymerization reaction is followed by temperature profile until the apparition of a temperature peak or by in-line spectroscopy.

In order to increase the initiation and propagation rate, especially when using alkyllithium like n-butyllithium, small amount of polar compounds can be added, eventually in mixture with solvent to the reaction medium before adding the initiator. By modifying the polarity of the medium, one also affects the randomization of the monovinyl-substituted aromatic monomer during the copolymerization of said monomer in mixture with the conjugated diene (see below).

Step (2) is charging in the living cement obtained after step (1) a conjugated diene monomer referred to as $B_1$. The proportion by weight of $B_1$ to total monomer charge is preferably comprised between 2% and 20% and most preferably between 5% and 15%. The contact time of step (2) is sufficient to allow polymerization to occur until essentially all the monomer is consumed.

Step (3) is charging a multi-functional deactivation agent X after completion of step (2). This deactivation agent is an agent known in the art to be a coupling agent, but used here for a different purpose, which is partial killing or deactivation. In the following, it will be referred to as either the deactivation agent or the coupling agent (without making any difference). The r amount of said mult-functional deactivator is selected so as to be less than the stoichiometric amount relative to the initiator really used to start the polymerization and referred to as $RM_a$.

One of the key aspects of the invention is the control of the respective amounts of initiator and deactivating agent.

The r amount will be adjusted with respect to the active initiator molar amount $RM_a$ so that only partial killing of a proportion of the living polymer chains occurs. For example, only about 60% by number of the living polymer chains are killed by the multi-functional deactivation agent. The multi-functional deactivation agent X has typically n functions where n from 2 to 8, preferably greater than 2 and where said n functions are able to deactivate n living polymeric species, is added to the reaction medium in an amount calculated with respect to the active initiator amount, according to one of the key aspects of the invention.

In the invention, the ratio deactivating agent X:initiator (e.g., $RM_a$) is comprised between 0.5 and 0.9 of the stoichiometry, preferably between 0.6 and 0.8.

This ratio, together with the molar amounts of the multi-functional deactivation agent and active initiator introduced, will control the ratio of short chains versus long chains as well as their respective molecular weights.

Among the suitable deactivator agents are the coupling agents taken from those listed in U.S. Pat. No. 5,545,690, columns 3 and 4. Examples are di- or multivinylaromatic compounds, di- or multiepoxides, di- or multiketones, di- or multihalides, particularly silicon halides and halosilanes, the esters of monoalcohols with polycarboxylic acids and the like and mixtures of two or more compounds. A preferred class is the one of epoxidized vegetable oils such as epoxidized soybean oil, epoxidized linseed oil and the like or mixtures thereof e.g. Flexol Plasticizer LOE from DOW or Edenol B316 from Henkel or Vikoflex® from Dow.

Step (4) is charging a mixture of a conjugated diene referred to as $B_2$ and a monovinyl-substituted aromatic referred to as S2. The reaction will generally be carried out in the presence of a randomizer or random distribution agent.

The random distribution of the monomer in the $B_2/S_2$ segment is ensured by introducing a random distribution agent into the solvent present in the reaction medium. This random distribution agent is a polar compound and is selected from Lewis bases, such as tertiary amines and polar agents comprising ethers including cyclic ethers, aliphatic monoethers and aliphatic polyethers. Other agents include, for example, triethylamine, tripropylamine, tributylamine, N,N-dimethylanaline, tetramethylethylenediamine, pyridine, quinoline, and trimethyl ethylene diamine as examples of tertiary amines. As examples of ethers of such agents, the agents may include tetrahydrofuran, $C_2$ and $C_3$ dialkyl ethers, diethylene glycol dimethyl ether, diethylene glycol diethyl ether, anisole, dioxanne, 1,2-dimethoxyethane and tetrahydropyran. The random distribution agent, esp the polar agent, may be employed in an amount of from 0.01 to 5 parts per 100 parts by weight of resin (phr).

By a proper selection of the polar compound, or randomizer, it is possible to adjust the proportion of the random monovinyl-substituted aromatic monomer dispersed in the conjugated diene phase. As these polar compounds also affect the 1,2 addition of the conjugated diene monomer and the resulting vinyl character, it is possible to adjust the molecular structure of the $B_1$-$B_2/S_2$ part of the copolymer.

In one embodiment of this invention, it is feasible to add an additional amount of randomizer or polar compound or mixture thereof in order to increase the random part of the monovinyl-substitued monovinyl-substituted aromatic monomer and/or promote the 1,2 addition of the conjugated diene.

The proportion by weight of $S_2$ to the total monomer charge is comprised between 50% and 80% and most preferably between 55% and 70%. The proportion by weight of $B_2$ to the total monomer charge is comprised between 5% and 25% and most preferably between 7% and 20%.

At the beginning of said step (4), the temperature of the reaction medium which is referred to as the copolymerization temperature ($T_{copo}$) is preferably set below 50° C., more preferably below 45° C.

The contact time of step (4) is sufficient to allow polymerization to occur until essentially all the monomer being consumed. The completion of the polymerization reaction is followed by recording the temperature profile until the apparition of a temperature peak or by on-line spectroscopy. The temperature peak of said step (4) is preferably set below 120° C. and more preferably below 110° C.

After completion of the polymerization a mono-functional deactivation agent or terminating agent is added to the reactor in order to destroy all remaining living polymeric chains. The terminating agent may be selected from those well known in the art like water, organic acids, alcohols, and the like.

After completion of the terminating reaction, the gas are typically flashed out of the reactor in order to concentrate the reaction solution and the resulting cement is treated with proton donors compounds, as well known in the art, to remove remaining alkali metal bound to the polymeric species, if any, and neutralize any strong base eventually present in the reaction medium. Suitable proton donors molecules that can be selected in the present invention include mineral or organic acid. An example can be found in U.S. Pat. No. 4,877,863 to Lanza et al.

After or before the final devolatilization, antioxidants, antiblocking agent and/or other technical additives are added, according to known techniques in the art.

Use of Copolymers

The block copolymers obtained according to the process of the invention are completely transparent and can be mixed with other polymers and used in a variety of applications. The polymers include, for example, resins such as crystal polystyrene, polyolefins such as polyethylene or polypropylene, styrene copolymers such as styrene-methyl methacrylate (SMMA), styrene-maleic anhydride (SMA), styrene-acrylonitrile (SAN) to be used for example for the production of a variety of different objects which can be extruded, thermoformed, injection molded, blow molded or made into films or sheets.

The production of transparent block copolymers of greater impact resistance provides the advantage that for a given impact performance, (with similar or improved transparency) reduced thickness of material is required leading to lower material cost and increased production speeds. Alternatively, for the same material thickness, the transparency and impact resistance are required as compared to known resins.

The preferred embodiments of the present invention are illustrated further with reference to the following non-limiting Examples.

Molecular Weights

Molecular weights of the polymers are determined by size exclusion chromatography (SEC). Polymers are first dissolved in tetrahydrofurane (THF) and injected in 2 columns PL-gel <<mixed B>> ($10 \mu l$/30 cm) in series. THF was used as the mobile phase with a flow rate of 1 ml/min. Calibration of the SEC was done with polystyrene standards TSK PS from TOSOH (Japan). Molecular weights given are measured at the peak of the distribution and calculated in function of the composition.

EXAMPLES

Test Procedures

Composition and Random Index

The composition (content in styrene and butadiene) and the random index are determined by recording a $^1$H NMR spectrum (on a Brücker DPX 300 MHz spectrometer) of a solution of the copolymer dissolved in $CDCl_3$ with trimethylsilane (TMS) as a standard (delta=0 ppm).

Viscosity in Solution

The viscosity in solution is determined according to ASTM D-445 by measuring the time needed for a solution of the polymer in toluene (3.8 g in 80 ml) at 25° C. to flow in a calibrated capillary tube (Cannon-Fenske). It is then converted in cSt.

Melt Flow

The melt flow index is determined according to ASTM D-1238 (200° C., 5 kg) and is expressed in g/10 min.

Spiral Slow

The injectability of the resin is determined by measuring the so-called spiral flow. It is based on the distance the resin flows under controlled conditions of pressure and temperature along a spiral runner 4ACC of constant cross section (diameter: 46 mm, length: 120 mm, thickness: 2.5 mm). The spiral flow is expressed in cm.

Conditions
  pressure: 100 bar
  temperature: 220° C.
  holding time: 5 s
  holding pressure: 100 bar
  temperature of the mold: 30° C.
  cooling time: 20 s
  injection: 180 cm$^3$/s Resistance to Impact The impact resistance (energy at break) is determined according to ISO 6603-2 on molded disks (diameter 60 mm, thickness: 2 mm).

Modulus and Elongation

The modulus is measured according to ISO 178. Elongation is determined according to ISO 527-2.

Optical Properties

Optical properties are determined according to ASTM D-1003 on molded disks (diameter: 60 mm, thickness: 2 mm).

Example 1

The following quantities were introduced into a stirred pressurized reactor. First, 45631 g of a solvent mixture consisting of 85% cyclohexane and 15% hexane were introduced. Then 9.12 g of tetrahydrofurane (THF) and 1541 g of styrene monomer (referenced as styrene 1) were added. The temperature of the mixture was raised to 45° C. and 0.253 mol of n-butyllithium (diluted at 20% in n-hexane) were injected quickly in the reactor. The block S1 thus polymerized had a molecular weight of 8600 Daltons. At the end of this first stage, the temperature was 54° C.

Then sequenced polymerization was continued by injecting 1260 g of 1,3-butadiene (referenced as butadiene 1). The polymerization of this second block was left for 30 min and 9 g of FLEXOL LOE was added leading to structure (i) R-(S1-B1)X.

The molecular weight of R-(S1-B1)X was 59600 Daltons. At the end of this first stage, the temperature was 51° C.

Polymerization was carried on by simultaneously injecting 1260 g of 1,3-butadiene (referenced as butadiene 2) and 7939 g of styrene (referenced as styrene 2) so as to form the R-S1-B1-B2/S2-M block copolymer of final molecular weight of 156600 Daltons. During this stage, the temperature of the reaction medium increased from 44° C. to reach 95° C.

The final living polymer thus formed was deactivated by water and organic acid was then introduced to neutralize the alkaline residues. Finally, an antioxidant system formed by Irganox 1076 (24.0 g), Irganox 3052 (12.0 g) and TNPP (84.0 g) was added. The copolymer was recovered by removing the solvent and pelletized.

Characteristics of the Copolymer of Example 1:
  styrene content: 79.6%
  1,3-butadiene content: 20.4%
  random styrene: 17.1%
  melt flow index: 14 g/10 min
  viscosity in solution: 5.0 cSt Evaluation of the Copolymer of Example 1
  spiral flow: 66 cm
  flexural modulus: 1373 MPa
  tensile at break: 192%
  haze: 1.3%
  energy at break: 29 J
  ductile behavior Copolymer of example 1 was also injected to obtain usual articles like audio tapes or $600 \mu$ cups. The articles were of high quality with good mold filing.

Example 2

Example 1 was repeated with all conditions constant except the following:
  styrene 1: 1560 g
  butadiene 1: 1200 g
  styrene 2: 7440 g
  butadiene 2: 1800 g Characteristics of the Copolymer of Example 2:
  styrene content: 74.9%
  1,3-butadiene content: 25.1%
  molecular weight of R-(S1-B1)X: 71000 g/mol
  molecular weight of R-S1-B1-B2/S2-M: 159000 g/mol
  random styrene: 17.0%
  melt flow index: 15 g/10 min Evaluation of the Copolymer of Example 2:
  spiral flow: 67 cm
  flexural modulus: 1230 MPa
  tensile at break: 208%
  haze: 2.5%
  energy at break: 27 J
  ductile behavior

Comparative Example 3

The following quantities were introduced into a stirred pressurized reactor. First, 44193 g of a solvent mixture consisting of 85% cyclohexane and 15% hexane were introduced. Then 9.63 g of tetrahydrofurane (THF) and 2000 g of styrene monomer (referenced as styrene 1) were added. The temperature of the mixture was raised to 45° C. and 0.170 mol of n-butyllithium (diluted at 20% in n-hexane) were injected quickly in the reactor. The block S1 thus polymerized had a molecular weight of 16800 Daltons. At the end of this first stage, the temperature was 54° C.

Polymerization was then carried on by simultaneously injecting 3240 g of 1,3-butadiene (referenced as butadiene 1) and 6760 g of styrene (referenced as styrene 2) so as to form the R-S1-B1/S2-M block copolymer of final molecular weight of 108600 Daltons. During this stage, the temperature of the reaction medium increased from 45° C. to reach 95° C.

The final living polymer thus formed was deactivated by the addition water and propionic acid was then introduced in order to neutralize the alkaline residues. Finally, an antioxidant system formed by Irganox 1076 (24.0 g), Irganox 3052 (12.0 g) and TNPP (84.0 g) was added. The copolymer was recovered by removing the solvent and pelletized.

Characteristics of the Copolymer of Comparative Example 3:
  styrene content: 75.7%
  1,3-butadiene content: 24.3%
  random styrene 17.1%
  melt flow index: 15 g/10 min
  viscosity in solution: 4.9 cSt Evaluation of the Copolymer of Comparative Example 3:
  spiral flow: 45 cm
  flexural modulus: 900 MPa
  tensile at break: 475%
  haze: 2.6%
  energy at break: 31 J
  ductile behavior Although the copolymers of examples 2 and 3 have same styrene content, same random styrene content and similar melt flows, the injectability is poorer for copolymer of example 3. This illustrates that the intermediate deactivating step in the preparation of the copolymer dramatically improves the properties of the polymer.

The table below summarizes the properties obtained with the copolymers described in comparison to other resin.

|  | Ex. 1 | Ex. 2 | Ex. 3 (comp.) |
|---|---|---|---|
| styrene content [%] | 79.6 | 74.9 | 75.7 |
| random styrene [%] | 17.1 | 17.0 | 17.1 |
| melt flow [g/10 min] | 14 | 15 | 15 |
| spiral flow [cm] | 66 | 67 | 45 |
| flexural modulus [MPa] | 1373 | 1230 | 900 |
| tensile at break [%] | 195 | 208 | 475 |
| energy at break [J] | 29 | 27 | 31 |
| Haze [%] | 1.3 | 2.5 | 2.6 |

The invention claimed is:

1. A process for the production of a transparent resinous copolymer, the process comprising the sequential steps, in a reaction medium, of:
   (a) charging in the presence of an initiator, a first monovinyl-substituted aromatic monomer and contacting it until all the monomer is polymerized;
   (b) charging a conjugated diene and allowing the polymerization to occur;
   (c) charging a multi-functional deactivation agent to kill a fraction of the living polymer species generated in step (b);
   (d) charging a mixture of a second monovinyl-substituted aromatic monomer and a second conjugated diene monomer and allowing polymerization to occur in the presence of a random distribution agent until all the monomers are consumed; and
   (e) recovering the polymer using a terminating agent.

2. The process of claim 1 carried out in the presence of a polar compound added in step (a).

3. A process for the production of a transparent resinous copolymer, the process comprising the sequential steps, in a reaction medium, of:
   (a) polymerizing a monovinyl-substituted aromatic monomer ($S_1$) in a solvent in presence of a polar compound and a initiator ($RM_a$) until essentially no unreacted monovinyl-substituted aromatic monomer is left in the so-formed mixture (i) to form at least the species R-$S_1$-M;
   (b) adding to said mixture (i) a conjugated diene ($B_1$) and allowing the polymerization to occur until essentially no conjugated diene is left in the so-formed mixture (ii) to form at least the species R-$S_1$-$B_1$-M;
   (c) charging to said mixture (ii) a multi-functional deactivator agent (X) to partially kill the living chains present in the so-formed mixture (iii) to form at least the species ($S_1$-$B_1$)X;
   (d) adding to said mixture (iii) a mixture of monovinyl-substituted aromatic monomer ($S_2$) and conjugated diene monomer ($B_2$) and allowing the copolymerization to occur until essentially no unreacted monomers are left in the so-formed (iv) mixture to form at least the species R-$S_1$-$B_1$-$B_2$/$S_2$-M; and
   (e) recovering the so-formed species R-$S_1$-$B_1$-$B_2$/$S_2$-M (v) using a terminating agent.

4. The process of claim 3, wherein the process uses a X:$RM_a$ stoichiometric ratio of between 0.5:1 and 0.9:1.

5. The process of claim 3, wherein the $X:RM_a$ stoichiometric ratio is between 0.6:1 and 0.8:1.

6. The process of claim 1, wherein the proportions by weight of the first vinyl aromatic monomer/first conjugated diene monomer/second vinyl aromatic monomer/second conjugated diene monomer are, in percent based on the total amount of monomers, 5–30/2–20/50–80/5–25, inclusive.

7. The process of claim 1, wherein the proportions by weight of the first vinyl aromatic monomer/first conjugated diene monomer/second vinyl aromatic monomer/second conjugated diene monomer are, in percent based on the total amount of monomers, 10–25/5–15/55–70/7–20, inclusive.

8. The polymer obtained by the process of claim 1.

9. A transparent resinous conjugated diene/vinyl aromatic block copolymer comprising:
  (i) a first conjugated diene/monovinyl-substituted aromatic block copolymer, resulting from the partial deactivation by a multi-functional agent of the living species $R-S_1-B_1-M$ wherein $S_1$ is a monovinyl-substituted vinyl aromatic block, $B_1$ is a conjugated diene block, RM being an initiator wherein the living species $R-S_1-B_1-M$ has a molecular weight comprised between 10,000 and 50,000 Daltons and a vinyl aromatic content comprised between 40 and 90% by weight; and
  (ii) a second conjugated diene/monovinyl-substituted aromatic block copolymer, resulting from the copolymerisation of a conjugated diene $B_2$monovinyl-substituted aromatic $S_2$ monomers mixture in presence of the remaining living species $R-S_1-B_1-M$ to form the species $R-S_1-B_1-B_2/S_2-M$ wherein $B_2/S_2$ is a tapered block, wherein said species $R-S_1-B_1-B_2/S_2-M$ has a molecular weight comprised between 90,000 and 300,000 Daltons and a vinyl aromatic content comprised between 60% and 85% by weight.

10. The transparent resinous copolymer of claim 9, wherein the resinous copolymer comprises from 5 to 40 wt % of said first conjugated diene/vinyl aromatic block copolymer.

11. A transparent resinous conjugated diene/vinyl aromatic block copolymer comprising:
  (i) a first conjugated diene/vinyl aromatic block copolymer, having a radical structure with chains having a molecular weight comprised between 10,000 and 50,000 Daltons and a vinyl aromatic content comprised between 40 and 90% by weight; and
  (ii) a second conjugated diene/vinyl aromatic block copolymer, having a tapered structure with chains having a molecular weight comprised between 90,000 and 300,000 Daltons and a vinyl aromatic content comprised between 75% and 90% by weight;
  the resinous copolymer comprises from 5 to 4 wt % of said first blocks; and the total vinyl aromatic content of the resinous copolymer being comprised between 70 and 85% by weight.

12. The transparent resinous copolymer of claim 9 wherein the structure of the first copolymer is of the type (S, -B,) X where X has n functions where n is from 2 to 8.

13. The transparent resinous copolymer of claim 9, wherein the total vinyl aromatic content is comprised between 75 and 82% by weight.

14. The transparent resinous copolymer of claim 9, wherein the first conjugated diene/monovinyl-substituted aromatic block has a vinyl aromatic content comprised between 40 and 65% by weight.

15. The transparent resinous copolymer of claim 9, wherein the molecular weight of the second copolymer chain is comprised between 150,000 and 180,000 Daltons.

16. A resinous blend comprising at least one transparent resinous copolymer of claim 9.

17. A process for manufacturing molded objects comprising the step of injecting the transparent resinous copolymer of claim 9 or the blend of a resinous blend comprising at least one transparent resinous copolymer of claim 9.

* * * * *